Sept. 4, 1951     E. J. FARKAS     2,566,519
AUTOMATIC TRANSMISSION
Filed Dec. 29, 1945     2 Sheets-Sheet 1
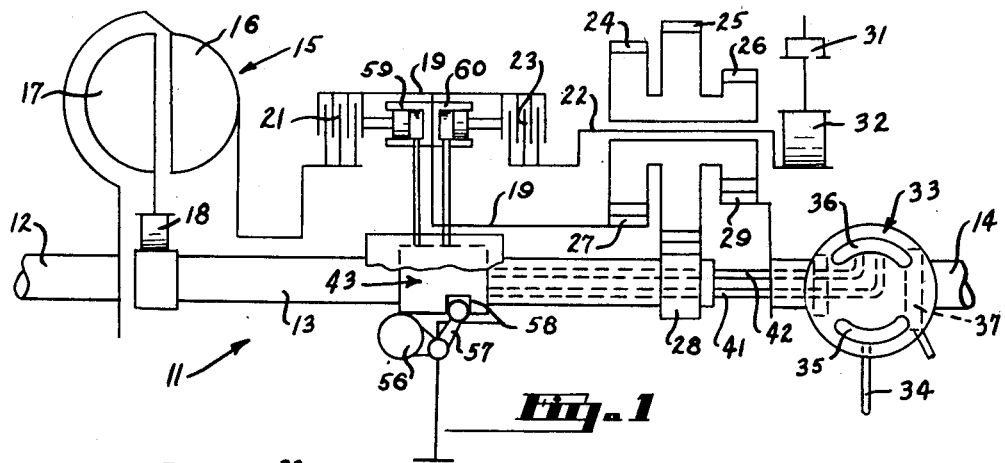
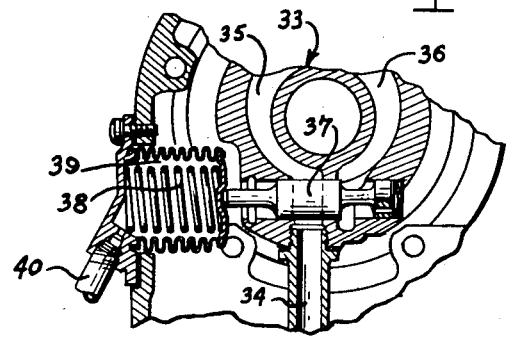
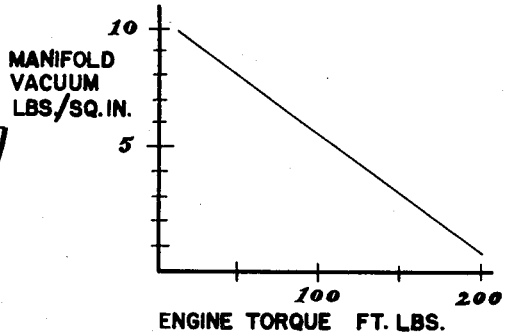
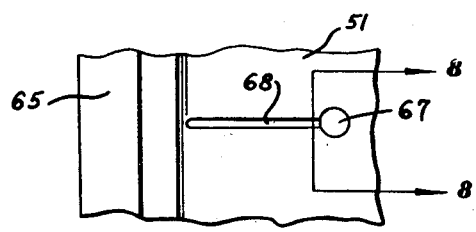
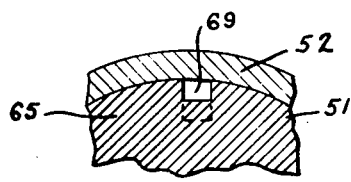
E.J. FARKAS
*INVENTOR.*
BY
    C.C. McRae
    R. D. Harris
    J. R. Faulkner
    J. H. Oster
ATTORNEYS.

Sept. 4, 1951  E. J. FARKAS  2,566,519
AUTOMATIC TRANSMISSION
Filed Dec. 29, 1945  2 Sheets-Sheet 2

E. J. FARKAS
INVENTOR

BY
C. C. McRae
R. D. Harris
J. R. Faulkner
T. H. Oster

ATTORNEYS.

Patented Sept. 4, 1951

2,566,519

UNITED STATES PATENT OFFICE 2,566,519

AUTOMATIC TRANSMISSION

Eugene J. Farkas, Detroit, Mich., assignor to Ford Motor Company, Dearborn, Mich., a corporation of Delaware Application December 29, 1945, Serial No. 637,846

11 Claims. (Cl. 74—752)

This invention relates generally to an automatic transmission, and more particularly to an automatic transmission in which the transition between the various speed ratios is effected at varying vehicle speeds in accordance with load conditions.

The present invention comprises an improvement of the automatic transmission disclosed in my co-pending application, Serial No. 611,975, filed August 22, 1945, now Patent #2,528,584, November 7, 1950. Reference is also made to the co-pending application of Eugene J. Farkas and Joseph W. Rackle, Serial No. 626,562, filed November 11, 1945, now Patent #2,528,585, November 7, 1950.

The automatic transmission of the above-mentioned co-pending applications includes a multiple planetary gearing system adapted to transmit torque from a drive shaft to a load shaft at a plurality of different speed ratios, with the transition between the various speed ratios taking place automatically by the operation of clutches activated by fluid under pressure supplied by a fluid pump and regulated by a governor-controlled sleeve valve. Axial movement of the sleeve valve by the centrifugal governor is opposed by coil springs providing a constant timing for the various shifts. A disadvantage of this construction resides in the fact that the transmission is shifted between the various speed ratios at definite, fixed vehicle speeds, irrespective of the particular load on the vehicle. The inflexibility of this arrangement impairs the performance of the vehicle, since the maximum performance and smoothness can only be obtained when a shift to a higher speed ratio is retarded under heavy torque and advanced under light torque conditions.

It is therefore a principal object of the present invention to provide an automatic transmission of the general type described above, in which the transmission is shifted between the different speed ratios at varying vehicle speeds depending upon the particular load on the vehicle at the time the shift is made. The shift between any two speed ratios takes place at a speed somewhere within a predetermined speed range. With a light load the shift is made at the lower end of the speed range, and with heavier loads delayed until a higher speed is reached. This not only provides greater flexibility, but results in automatically shifting the transmission between the various speed ratios at the most desirable speeds for the existing conditions, materially benefitting the vehicle performance and smoothness.

The construction for accomplishing the above-mentioned advantageous results includes a pressure relief valve employed in connection with the fluid pump and modulated by an expansible vacuum chamber connected with the engine manifold to automatically obtain a variable fluid pressure reaching a maximum under full load and progressively decreasing as the load or torque decreases. This variable fluid pressure is introduced into a chamber at one end of the sleeve valve and opposes axial movement of the sleeve valve by the centrifugal governor. Since the pressure varies directly with the load, less resistance to axial movement of the sleeve valve is afforded when the transmission is operating under light load conditions, resulting in the transmission being shifted to the next higher speed ratio at a relatively low speed. When the load is greater, however, movement of the valve is opposed by a correspondingly greater fluid pressure, and the shift is retarded, taking place at a higher speed.

A further object is to provide means for admitting the variable fluid pressure into the chamber adjacent the sleeve valve, regardless of the position of the latter, and for proportionately reducing the variable pressure to provide the proper resistance to the action of the centrifugal governor. During the shift from first and second speed, movement of the sleeve valve is opposed solely by fluid pressure, but during the shift from second to third speed the opposition afforded by the variable fluid pressure is augmented by a coil spring. The constant resistance of the spring and the variable resistance of the fluid combine to provide a variable resistance at a higher level for the shift from second to third speed, providing a sufficiently positive action for the valve and resulting in improved operation of the transmission.

Other objects and advantages of the present invention will be made more apparent as this description proceeds, particularly when considered in connection with the accompanying drawings, in which:

Figure 1 is a longitudinal vertical schematic drawing of the transmission.

Figure 2 is a transverse cross-sectional view taken through the fluid pump and vacuum controlled relief valve of the transmission.

Figure 3 is a graph showing the relationship between the manifold vacuum pressure and engine torque.

Figure 7 is an enlarged fragmentary plan view of the inner sleeve of the valve body.

Figure 8 is a cross-section taken on the line 8—8 of Figure 7.

Figure 9 is a cross-section taken on the line 9—9 of Figure 4.

Figure 4:
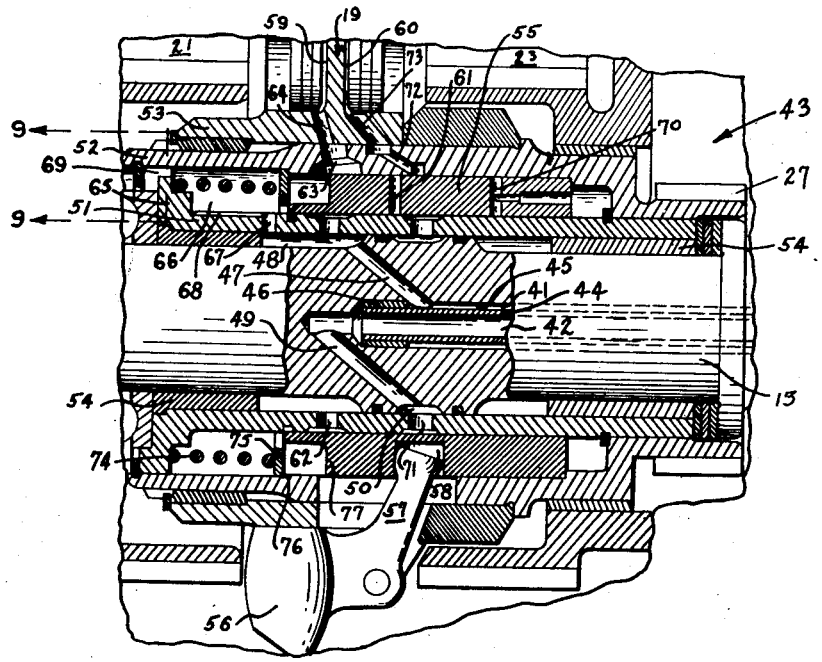
Figure 4 is an enlarged longitudinal cross-sectional view of a portion of the transmission showing the governor controlled hydraulic valve.

It will be noted that the general construction of the transmission is shown schematically in the drawings, reference being made to the above-mentioned co-pending applications for a more detailed description and illustration of the mechanism.

Referring now particularly to Figure 1, there is shown an automatic transmission 11 having a drive shaft 12 driven by the vehicle engine, a main shaft 13, and a load shaft 14 adapted to be connected to the rear axle drive means. The transmission includes a fluid coupling 15 having an impeller 16 driven by the drive shaft 12, and a runner 17 connected to the main shaft 13 by an overrunning clutch 18.

The impeller 16 of the fluid coupling is adapted to be operatively connected to a clutch carrier 19 by a disc clutch 21, known as the second speed clutch. The clutch carrier 19 is also adapted to be locked to the planet carrier 22 by means of a disc clutch 23, known as the third speed clutch. The second and third speed clutches are actuated automatically by hydraulic mechanism to be described later.

The planet carrier 22 is mounted for rotation about the axis of the main shaft 13 and carries clusters of planet pinions 24, 25, and 26. Planet pinion 24 is adapted to mesh with a sun gear 27 carried by the clutch carrier 19. Planet pinion 25 meshes with a sun gear 28 mounted on the main shaft 13, and planet pinion 26 with sun gear 29, the latter being carried by the load shaft 14. Reverse rotation of the planet carrier 22 can be selectively prevented by means of a forward speed brake 31, operating through an overrunning clutch 32.

Fluid pressure for operating the second and third speed clutches is provided by a fluid pump 33 driven by the load shaft 14. Fluid is supplied from the transmission sump (not shown) through the intake tube 34 to the intake chamber 35 of the pump 33, and is delivered under pressure by the pump to the pressure chamber 36. As best seen in Figure 2, a pressure relief valve 37 in the form of a reciprocable plunger is arranged to control the pressure in the chamber 36, by establishing temporary communication between the pressure and intake chambers 36 and 35, respectively.

Axial movement of the relief valve 37 to the left under the action of the fluid pressure in the pressure chamber 36 is opposed by a coil spring 38. The coil spring is inclosed within an expansible Sylphon chamber 39 which communicates by means of a conduit 40 to the manifold of the vehicle engine (not shown).

The chart shown in Figure 3 shows that the relationship between manifold vacuum and engine torque is substantially a straight line function for any given engine speed, decreasing from a maximum value at no load or torque to a minimum value at full engine torque. The application of this variable vacuum pressure to the Sylphon chamber 39 results in modifying the action of the coil spring 38, and consequently the movement of the relief valve 37, in accordance with the torque requirements. At full torque the relief valve 37 maintains a maximum fluid pressure in the pressure chamber 36, and as the torque decreases the fluid pressure progressively decreases to a minimum value. It has been found that a satisfactory fluid pressure range is from 80 pounds per square inch maximum to 40 pounds per square inch minimum.

Referring again to Figure 1, it will be seen that the variable fluid pressure from the pressure chamber 36 of the pump is transmitted through conduits 41 and 42 to a governor controlled hydraulic valve 43. With reference now to Figure 4, it will be seen that part of the second speed conduit 41 comprises an annular passage formed around the outside of a tube 44 positioned within an enlarged bore 45 in the main shaft 13. The interior of the tube 44 constitutes part of the third speed conduit 42. A bushing 46 supports the forward end of tube 44 and provides a fluid seal for the end of conduit 41. An inclined passage 47 in the shaft 13 establishes communication between the second speed conduit 41 and an annular second speed fluid supply groove 48. Another inclined passage 49 establishes communication between the third speed conduit 42 and an annular third speed fluid supply groove 50 surrounding the main shaft 13.

The hydraulic valve 43 mentioned above comprises a valve body formed of a pair of spaced inner and outer sleeves 51 and 52 respectively, arranged concentrically with the main shaft 13. The outer sleeve 52 is splined to the inner hub 53 of the clutch carrier 19 and has integrally formed therewith at one end the sun gear 27. The inner sleeve 51 is mounted on the main shaft 13 by means of bushings 54. A sleeve valve 55 is slideably mounted in the annular chamber formed between the inner and outer sleeves 51 and 52 and is arranged to be axially shifted by means of a centrifugal governor 56. The governor 56 is pivotally mounted upon the clutch carrier 19 for rotation therewith as a unit and has a lever arm 57 engaging a notch 58 in the sleeve valve 55. It will be apparent that the weighted end of the centrifugal governor 56 is movable in a radial direction as the speed of the clutch carrier varies, resulting in axially moving the sleeve valve 55 by means of the lever arm 57.

The sleeve valve 55 is shown in Figure 4 in its fully retracted position. In this position the valve blocks the flow of fluid from both the second and third speed fluid supplies 48 and 50 to the second and third speed cylinders 59 and 60. Consequently, neither the second speed clutch 21 nor the third speed clutch 23 are operated. Under these conditions, power is transmitted from the drive shaft 12 through the fluid coupling 15 to the main shaft 13, and thence to sun gear 28, planet pinions 25 and 26, and sun gear 29 to the load shaft 14, driving the latter in the forward direction in low or first speed.

It will be noted that cooperating ports are formed in the inner sleeve 51, the sleeve valve 55, the outer sleeve 52 and the clutch carrier hub 53, in order to provide fluid communication between the second and third speed fluid supply grooves 48 and 50 and the second and third speed fluid cylinders 59 and 60 respectively. The second and third speed cylinders are carried by the clutch carrier 19 and are arranged to operate the second and speed clutches 21 and 23 respectively.

Figure 5:
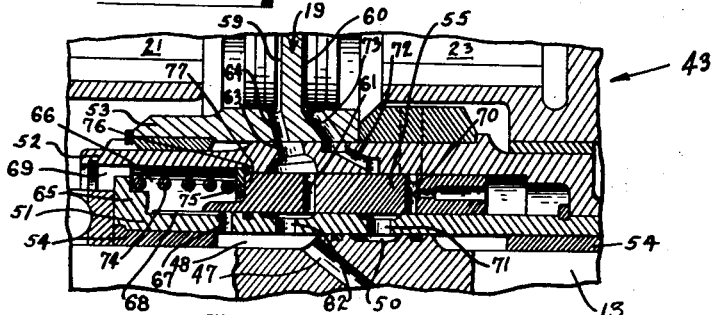
Figure 5 is a cross-sectional view similar to a portion of Figure 4 but illustrating the sleeve valve in position for effecting a shift from first to second speed.

It will be seen that when the sleeve valve 55 has been axially shifted from the position shown in Figure 4 to that shown in Figure 5, the radial port 61 in the sleeve valve establishes communication between the second speed port 62 in the inner sleeve 51 and the second speed ports 63 and 64 in the outer sleeve 52 and the hub 53, respectively. The second speed fluid supply is then connected to the second speed cylinder 59 and the second speed clutch 21 is actuated. Operation of the second speed clutch locks the drive shaft 12 and the impeller 16 of the fluid coupling to the clutch carrier 19 which, in turn, drives the outer sleeve 52 and the sun gear 27 formed thereon to drive the triple planetary pinion through the planet pinion 24. The drive is again taken from the planet pinion 26 to the sun gear 29 on the load shaft 14, rotating the latter at an intermediate or second speed ratio.

Figure 6:
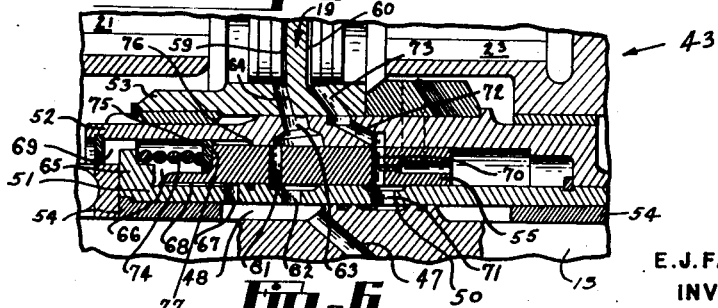
Figure 6 is a cross-sectional view similar to a portion of Figure 4 but illustrating the sleeve valve in position for effecting a shift from second to third speed.

It will be seen in Figures 4, 5 and 6 that the inner sleeve 51 of the valve body is provided with an integral radially extending flange 65 at one end, engaging the outer sleeve 52 to form a fluid chamber 66 between the inner and outer sleeves at one end of the slideable sleeve valve 55. Fluid communication is established between the fluid chamber 66 and the second speed fluid supply groove 48 by means of a radial port 67 formed in the inner sleeve 51. A small axially extending groove 68 is formed on the outer periphery of the inner sleeve 51 in communication with the port 67. The groove 68 permits the entry of fluid under pressure into the fluid chamber 66 even though the radial port 67 has been covered by axial movement of the sleeve valve 55. The fluid chamber 66 is provided with an outlet 69, in the form of a notch cut in the outer periphery of the radial flange 65 of the inner sleeve 51.

Inasmuch as the fluid in the second speed supply groove 48 is supplied by the fluid pump 33 and modulated by the vacuum controlled pressure relief valve 37, it follows that the fluid pressure in the fluid chamber 66 of the governor controlled hydraulic valve is correspondingly modulated in accordance with the torque requirements.

Upon reference to Figures 4 to 9 inclusive, it will be noted that the area of the axial groove 68 forming the inlet for the fluid chamber 66 is substantially smaller than the area of the notch 69 forming the outlet therefor. With this arrangement the pressure of the fluid in the chamber 66 is reduced in amount relative to the pressure of the fluid in the second speed supply groove 48. By properly proportioning the sizes of the inlet and outlet 68 and 69 respectively, it is possible to obtain any desired ratio between the pressure supplied by the fluid pump and the pressure in the fluid chamber 66. In the present instance, it has been found advantageous to design the inlet and outlet so that the maximum pressure in the fluid chamber 66 will be approximately 11 pounds per square inch when the fluid pressure supplied by the pump is at its maximum value of 80 pounds per square inch. Since the pressure supplied by the pump varies from 40 to 80 pounds per square inch, depending upon the load or torque, the fluid pressure in the chamber 66 will vary from 5½ to 11 pounds per square inch.

The variable pressure in the fluid chamber 66 acts upon the adjacent end of the sleeve valve 55 and opposes axial movement of the sleeve valve by the centrifugal governor 56. This variable fluid pressure on the sleeve valve under different load conditions effects a variable timing in the shift from first to second speed, by requiring different centrifugal forces on the governor 56, and consequently different vehicle speeds, to move the sleeve valve to the position shown in Figure 5.

In the first mentioned copending application, the movement of the sleeve valve was opposed by a coil spring, and the shift from first to second speed was always effected at a constant vehicle speed. With the present construction, however, the shift from first to second speed may be effected at higher or lower speeds, depending upon the load on the vehicle. With a light load, the pressure in the fluid chamber 66 is smaller, and the sleeve valve will be shifted to the position shown in Figure 5 by the centrifugal governor 56 at a relatively low vehicle speed. With a greater load, the fluid pressure in the chamber 66 is greater, and the sleeve valve will not be shifted to the position actuating the second speed clutch until a greater vehicle speed has been attained. Thus, the speed at which the shift is effected is automatically governed by the load, and is made at the most effective speed for efficient operation and maximum performance.

With a further increase in the rotational speed of the clutch carrier 19, the centrifugal governor 56 is moved radially outwardly an additional amount, resulting in shifting the sleeve valve 55 further to the left. When the sleeve valve has been shifted to the position shown in Figure 6, communication is established between the third speed fluid supply groove 50 and the third speed cylinder 60 to actuate the third speed clutch 23. This communication is effected by alignment of the radial port 70 in the sleeve valve 55 with the third speed port 71 in the inner sleeve 51 and the third speed ports 72 and 73 in the outer sleeve 52 and the hub 53, respectively. Inasmuch as the second speed ports 62 and 63 in the inner and outer sleeves 51 and 52 are enlarged, communication is maintained between the second speed fluid supply groove 48 and the second speed cylinder 59 through the radial port 61 in the sleeve valve. Thus, both the second and third speed clutches are simultaneously actuated, resulting in the rotation as a unit of the clutch carrier 19, planet carrier 22 and the triple planetary pinions. Accordingly, a direct drive is established from the drive shaft 12 to the load shaft 14, transmitting torque in the third speed ratio at engine speed.

A helical coil spring 74 is positioned within the chamber 66, and is normally held in compression between the radial flange 65 at one end of the inner sleeve 51 and a retaining ring 75 which abuts a shoulder 76 formed on the inner periphery of the outer sleeve 52. Axial movement of the slideable sleeve valve 55 between the positions shown in Figures 4 and 5 to effect a shift from first to second speed is unobstructed by the coil spring 74. When, however, the sleeve valve is moved further, as in Figure 6, the adjacent end wall 77 of the sleeve valve engages the retaining ring 75, compressing the coil spring 74.

Movement of the sleeve valve 55 to the position shown in Figure 6 to effect a shift from second to third speed is thus opposed both by a constant spring pressure and a variable fluid pressure. The total resistance to movement of the sleeve valve when shifting from second to third speed is accordingly variable in amount, depending upon load conditions, but substantially larger than the resistance met when shifting from first to second speed, due to the added resistance afforded by the coil spring 74. The required balance for a smooth operation of the governor controlled hydraulic valve is thus obtained with a sufficiently positive action in shifting from second to third speed.

As in the shift from first to second speed, the speed at which the shift from second to third speed occurs varies with the particular load conditions, the shift being made at lower speeds with relatively light loads and at higher speeds with greater loads. The shifting of the transmission between the various speed ratios, both with increasing vehicle speeds and with decreasing vehicle speeds, is made at varying speeds within predetermined speed ranges in response to torque requirements. The governor controlled hydraulic valve is thus sensitive and responsive to the vehicle load and effects the necessary shifting between the speed ratios with a smoothness heretofore unobtainable and places the transmission in the proper speed ratio to obtain maximum performance at all times.

An advantageous feature of the above-described construction resides in the fact that these desirable results are obtained without increasing materially the complication of the transmission mechanism or adding to its cost.

It will be understood that the invention is not to be limited to the exact construction shown and described, but that various changes and modifications may be made without departing from the spirit and scope of the invention, as defined in the appended claims.

What is claimed is:

1. In a variable speed power transmission for a vehicle, in combination, a power shaft, a load shaft, gearing interposed between said power shaft and said load shaft and arranged for selective operation to transmit torque at a plurality of different speed ratios, fluid pressure actuated means for effecting said selective operation, a fluid pump supplying activating fluid under pressure to said means, means for varying the pressure of the fluid supplied by said pump in accordance with the load upon the vehicle, a governor controlled valve for controlling the flow of fluid from said pump to said first mentioned means, a fluid chamber adjacent said valve, and means admitting said variable fluid pressure from said pump into said fluid chamber to modify the movement of said valve by said governor.

2. In a variable speed power transmission for a vehicle, in combination, a power shaft, a load shaft, gearing interposed between said power shaft and said load shaft and arranged for selective operation to transmit torque at a plurality of different speed ratios, fluid pressure actuated means for effecting said selective operation, a fluid pump supplying activating fluid under pressure to said means, means for varying the pressure of the fluid supplied by said pump in accordance with the load upon the vehicle, a slideable sleeve valve effective on axial movement to control the flow of fluid from said pump to said first mentioned means, a governor controlling axial movement of said sleeve valve, a fluid chamber adjacent said sleeve valve, and means admitting modulated fluid under pressure from said pump into said fluid chamber to modify the axial movement of said sleeve valve by said governor.

3. In a variable speed power transmission for a vehicle, in combination, a power shaft, a load shaft, gearing interposed between said power shaft and said load shaft and arranged for selective operation to transmit torque at a plurality of different speed ratios, fluid pressure actuated means for effecting said selective operation, a fluid pump supplying activating fluid under pressure to said means, vacuum controlled means for varying the pressure of the fluid supplied by said pump as the load varies upon the vehicle, a slideable sleeve valve effective on axial movement to control the flow of fluid from said pump to said first mentioned means, a centrifugal governor urging said sleeve valve in one direction as the speed increases, a spring opposing the last mentioned movement of said valve, and means imposing the variable fluid pressure from said pump on said sleeve valve to augment said spring in opposing valve movement and to effect a variation in the selective operation of said transmission to retard a change to a higher speed ratio under conditions of high torque and to accelerate such a change under conditions of low torque.

4. In a variable speed power transmission for a vehicle, in combination, a power shaft, an intermediate shaft, a load shaft, power transmitting means for driving said intermediate shaft from said power shaft, a multiple planetary gearing system between said intermediate and load shafts, hydraulically actuated means for selectively operating said planetary gearing system to transmit torque to said load shaft at a plurality of different speed ratios, a fluid pump, a pressure relief valve for said pump, vacuum operated means acting on said relief valve to vary the pressure of the fluid supplied by said pump in accordance with the load upon the vehicle, a conduit from said pump to said hydraulically actuated means, a reciprocating valve controlling said conduit, speed responsive means for reciprocating said last mentioned valve, and means establishing fluid communication between said conduit and one side of said reciprocating valve.

5. The structure of claim 4 which is further characterized in that said reciprocating valve comprises a valve body concentric with said intermediate shaft, a sleeve slideable in said body and forming with said body a variable volume chamber at one end thereof, said chamber having an inlet establishing communication with said conduit to introduce a variable fluid pressure therein to modulate the actuation of said slideable sleeve by said speed responsive means.

6. The structure of claim 4 which is further characterized in that said reciprocating valve comprises a pair of spaced rotatable sleeves concentric with said intermediate shaft and forming a chamber therebetween, a sleeve valve slideable in said chamber, a centrifugal governor mounted for rotation with said rotatable sleeves and arranged to reciprocate said sleeve valve as the speed of rotation varies, said chamber having a fluid inlet at one end of said sleeve valve establishing communication with said conduit and an outlet forming an exhaust therefore, said outlet being larger than said inlet to reduce the pressure within said chamber relative to the pressure supplied by said pump.

7. In a variable speed power transmission, in combination, a power shaft, a load shaft, a multiple planetary gearing system interposed between said power and load shafts and adapted to be selectively operated to transmit torque in three different speed ratios, a pair of fluid pressure actuated clutches arranged to effect said selective operation, a fluid pump, a conduit from said pump to said fluid pressure actuated clutches, a reciprocating valve controlling said conduit, a governor for reciprocating said valve to selectively actuate said clutches, fluid pressure means communicating with said pump and opposing movement of said sleeve valve by said governor, and means for varying the fluid pressure supplied by said pump to said last mentioned fluid pressure means in accordance with the load upon the vehicle to form a variable resistance for said sleeve valve and vary the speed at which said clutches are actuated.

8. The structure of claim 7 which is further characterized in that said variable fluid pressure forms the sole resistance to movement of said sleeve valve when shifting between the first and second of said speed ratios, and a coil spring augmenting said variable fluid pressure in opposing movement of said sleeve valve when shifting between the second and third of said speed ratios.

9. In a variable speed power transmission, in combination, a power shaft, a load shaft, a multiple planetary gearing system interposed between said power and load shafts and adapted to be selectively operated to transmit torque in different speed ratios, fluid pressure actuated clutch means arranged to effect said selective operation, a fluid pump, a conduit from said pump to said fluid pressure actuated clutch means, a valve controlling said conduit, a governor arranged to move said valve to control said clutch means, fluid pressure means communicating with said pump and opposing movement of said valve by said governor, and means for varying the fluid pressure supplied by said pump to said last-mentioned fluid pressure means in accordance with the load upon the vehicle to form a variable resistance for said valve and vary the speed at which said clutch means is actuated.

10. In a variable speed power transmission for a vehicle, in combination, a power shaft, a load shaft, gearing interposed between said power shaft and said load shaft and arranged for selective operation to transmit torque at a plurality of different speed ratios, fluid pressure actuated means for effecting said selective operation, a fluid pump supplying activating fluid under pressure to said means, means for varying the pressure of the fluid supplied by said pump, a governor controlled valve for controlling the flow of fluid from said pump to said first-mentioned means, a fluid chamber adjacent said valve, and means admitting said variable fluid pressure from said pump into said fluid chamber to modify the movement of said valve by said governor.

11. In a variable speed power transmission for a vehicle, in combination, a power shaft, an intermediate shaft, a load shaft, power transmitting means for driving said intermediate shaft from said power shaft, a multiple planetary gearing system between said intermediate and load shafts, hydraulically actuated means for selectively operating said planetary gearing system to transmit torque to said load shaft at a plurality of different speed ratios, a fluid pump, means for varying the pressure of the fluid supplied by said pump in accordance with the load on the vehicle, a conduit from said pump to said hydraulically actuated means, a valve controlling said conduit, speed responsive means for operating said last-mentioned valve, and means establishing fluid communication between said conduit and one side of said valve to modify the movement of said valve by said speed responsive means.

EUGENE J. FARKAS.

REFERENCES CITED

The following references are of record in the file of this patent:

UNITED STATES PATENTS

| Number | Name | Date |
|---|---|---|
| 1,609,782 | Small | Dec. 7, 1926 |
| 1,619,701 | Chorlton | Mar. 1, 1927 |
| 2,100,810 | Livermore | Nov. 30, 1937 |
| 2,103,540 | Livermore | Dec. 28, 1937 |
| 2,120,104 | Livermore | June 7, 1938 |
| 2,221,393 | Carnegie | Nov. 12, 1940 |
| 2,260,406 | Roche | Oct. 28, 1941 |
| 2,282,949 | Dolza | May 12, 1942 |
| 2,286,193 | Bennetch | June 16, 1942 |
| 2,319,388 | Cotterman | May 18, 1943 |
| 2,402,248 | Hale | June 18, 1946 |